United States Patent
Shimofurutani (10) Patent No.: US 7,121,180 B2
(45) Date of Patent: Oct. 17, 2006

(54) BAND SAW, BAND SAW PROCESSING APPARATUS AND BAND SAW MANUFACTURING METHOD

(75) Inventor: Tatsuo Shimofurutani, Kitamuro-gun (JP)

(73) Assignee: Yugen Kaisha Marushimo Machine Saw, (JP)

( * ) Notice: Subject to any disclaimer, the term of this patent is extended or adjusted under 35 U.S.C. 154(b) by 0 days.

(21) Appl. No.: 10/601,685

(22) Filed: Jun. 23, 2003

(65) Prior Publication Data

US 2004/0035254 A1    Feb. 26, 2004

(30) Foreign Application Priority Data

Jun. 25, 2002    (JP) ............... 2002-184839

(51) Int. Cl.
    *B23D 61/12*    (2006.01)
(52) U.S. Cl. .......................... 83/661; 83/835
(58) Field of Classification Search ............... 83/835, 83/661; 30/113.1
    See application file for complete search history.

(56) References Cited

U.S. PATENT DOCUMENTS

| | | | | |
|---|---|---|---|---|
| 1,494,576 A | * | 5/1924 | Biedermann et al. ......... | 83/851 |
| 1,630,468 A | * | 5/1927 | Causey ........................ | 83/788 |
| 1,790,282 A | * | 1/1931 | Phillips ........................ | 83/661 |
| 2,064,261 A | * | 12/1936 | Howe et al. .................. | 83/661 |
| 2,787,299 A | * | 4/1957 | Anderson ..................... | 83/661 |
| 3,302,670 A | * | 2/1967 | Suekichi ....................... | 83/802 |
| 3,693,675 A | * | 9/1972 | Allen ........................... | 83/802 |
| 3,799,025 A | * | 3/1974 | Tsunoda ....................... | 83/835 |
| 4,236,432 A | * | 12/1980 | Kawakami et al. ........... | 83/848 |
| 4,602,434 A | * | 7/1986 | Stradling ...................... | 30/372 |
| 4,603,613 A | * | 8/1986 | Wilson ......................... | 83/661 |
| 5,094,135 A | * | 3/1992 | Nakahara et al. ............. | 83/847 |
| 5,317,945 A | * | 6/1994 | Waggerman .................. | 83/835 |
| 5,564,324 A | * | 10/1996 | Bird ............................. | 83/661 |
| 5,852,875 A | * | 12/1998 | Dolah .......................... | 30/113.1 |
| 5,901,630 A | * | 5/1999 | Kataoka et al. ............... | 83/835 |
| 6,220,139 B1 | * | 4/2001 | Kobayashi et al. ........... | 83/835 |

FOREIGN PATENT DOCUMENTS

| | | |
|---|---|---|
| JP | 37-19396 U | 7/1962 |
| JP | 47-4717 | 2/1972 |
| JP | 61-56047 | 12/1986 |
| JP | 1-188221 | 7/1989 |
| JP | 2-69201 | 3/1990 |
| JP | 7-45012 | 12/1995 |
| JP | 8-290326 | 11/1996 |
| JP | 9-503166 | 3/1997 |
| JP | 11-300523 | 11/1999 |

OTHER PUBLICATIONS

George Vondriska, Bandsaw Resawing, American Woodworker Magazine, Aug. 2000, p. 46.

* cited by examiner

*Primary Examiner*—Kenneth E. Peterson
(74) *Attorney, Agent, or Firm*—Rossi, Kimms & McDowell, LLP (57) ABSTRACT

A band saw includes a continuous saw body and multiple saw teeth provided on an edge portion of said saw body entirely. The edge portion of the saw body and the saw teeth are angled toward an inner side of the saw body by creating a bend near a tooth base line of the saw body. A band saw processing method and a method of manufacturing the band saw are also disclosed.

3 Claims, 7 Drawing Sheets

BAND SAW, BAND SAW PROCESSING APPARATUS AND BAND SAW MANUFACTURING METHOD

INCORPORATED BY REFERENCE

The disclosure of Japanese Patent Application No. 2002-184839 filed on Jun. 25, 2002 including the specification, drawings and abstract is incorporated herein by reference in its entirety.

BACKGROUND OF THE INVENTION

1. Field of the Invention

The present invention relates generally to band saws installed on band saw apparatuses to be used in lumber processing, and more particularly to a band saw which is novel in construction and capable of eliminating or minimizing occurrence of sawing bends (deemed herein to include cutting bends) due to cutting resistance or friction generated between the saw band and a lumber.

2. Description of the Related Art

As is well known in the art, a band saw used for cutting lumber and the like has a construction wherein multiple saw teeth are formed on the edge portion of a continuous annular plate. By suspending the band saw around a pair of saw wheels mounted on a band saw apparatus and causing it to revolve in the circumferential direction based on the driving of such saw wheels, the lumber or the like is sawed. When a conventional band saw is used continuously, the saw teeth undergo heat deformation or heat buckling due to cutting resistance or friction against the saw teeth, thereby causing the desired cutting precision and cutting efficiency to be lost and giving rise to the problem of so-called sawing bend. In addition, stress due to cutting resistance against the saw teeth tends to become concentrated at the saw tooth bases, causing cracking.

To cope with these problems, it has been conceived to coat certain areas of the saw teeth, saw tooth bases and the like with a hard material at prescribed locations, as described in JP-A-1-188221 or JP-U-7-45012, for example, thereby increasing the rigidity of the saw teeth and saw tooth bases However, in the band saw described in the above documents, the process of coating the saw teeth, saw tooth bases and the like with a hard material is troublesome and expensive. Further, since stress then becomes concentrated at the borders between the coated areas and the non-coated areas, the problems of deformation and cracking prone to occur at these border areas as a result of metal fatigue and the like.

In order to reduce the concentration of stress at the saw tooth bases, it has been proposed to subject the saw tooth bases to round edge processing, as described in JP-U-47-4717, or to slant each gullet (which shall herein be deemed to include the tooth base) at an angle from a prescribed point from the outer side of the saw along the saw's thickness, as described in JP-A-09-503166. However, because each saw tooth and saw tooth base of the band saw described in the above document must be individually processed, manufacturing and processing involve a substantial amount of work. Additionally, since it is difficult to maintain the overall strength of the saw due to the smaller volume of each saw tooth near the saw tooth base, neither of these processing operations is necessarily effective in preventing sawing bend due to heat buckling and the like.

In short, in the conventional constructions including those described above, it is difficult to easily and effectively strengthen the saw teeth and saw tooth bases. Accordingly, in order to prevent sawing bend and ensure stable cutting, the band saw must be replaced frequently, resulting in diminished cut lumber production efficiency.

SUMMARY OF THE INVENTION

It is therefore one object of this invention to provide a band saw having a new construction whereby the saw teeth and saw tooth bases are effectively strengthened and the durability of the saw teeth and the precision and efficiency of cutting can be effectively maintained for a long period of time, as well as to provide a band saw processing apparatus, manufacturing method and teeth setting method.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A band saw comprising: A band saw comprising: a continuous saw body; and multiple saw teeth provided entirely on one of laterally opposite edge portions of said saw body, wherein said one of laterally opposite edge portions of said saw body and said saw teeth are angled toward an inner side of said saw body by creating a bend near a tooth base line of said saw body.

According to a band saw having a construction conforming to this mode, improved are the rigidity and strength of the area of the tooth base line, to which severe external force is applied during cutting of sawn material, a tension band is created and the stress becomes dispersed. Accordingly, heat deformation of the saw teeth and cracking of the saw tooth bases are effectively inhibited. As a result, the desired cutting precision and durability are maintained for a long period of time, and the processing quality, including the quality (i.e., the texture) of the sawn surface can be maintained at a high level for a long period of time.

Furthermore, since this mode allows the saw teeth and saw tooth bases to be effectively strengthened simply by creating a bend in the saw tooth base line area of the saw body, superior processing capability that cannot be obtained with a conventional band saw can be obtained, and such capability can furthermore be obtained easily and at low cost.

Moreover, data from experiments conducted by the inventor makes clear that heat buckling of the saw teeth is effectively inhibited and superior durability is obtained by causing the saw teeth and the edge portion of the saw body to be angled toward the inner side, and not the outer side, of the saw body. The theoretical basis for making the saw teeth and the edge portion of the saw body angled toward the inner side of the saw body has not been made clear. While it is not the object of this invention to clarify such theoretical basis, it is reasoned that in this band saw, as heat deformation occurs to the saw teeth and the tooth bases, the tips of the saw teeth deform toward the outer side of the saw body due to the centrifugal force caused by the rotation of the saw wheels, but by causing the saw teeth and the edge portion of the saw body to be angled toward the inner side of the saw body, this deformation of the saw teeth and the edge portion of the saw body toward the outer side of the saw body can be effectively limited by means of a subtle bend created in the area of the line delineating the tooth bases.

In this embodiment, the tooth base line area of the saw body need not be specified with exact precision, so long as it is somewhere between the saw teeth and the center line of the saw body, but where a tension band is created near the tooth side of the saw body, it may be positioned anywhere between the tension band and the edge portion of the saw body. The bend created in the tooth base line area of the saw body may be achieved by rolling the saw body using a rolling machine (also referred to as a mill or rolling mill) used for rolling the saw body during saw tensioning or back-filling, for example, and particularly using a rolling machine having a pair of rollers with different cross-sectional configurations and outer diameters, degrees of hardness and the like, such that is forms a configuration in which a bend is created on the outer side of the saw body. It is preferred that the bend at the tooth base line run continuously along the entire circumference of the saw body, but depending on the cutting conditions or manufacturing conditions (for example, the processing of the welded part of the band saw), it is acceptable if the bend runs intermittently along the circumference.

(2) A band saw according to the above mode (1), wherein a projection is formed on the tip of each saw tooth, and a width of each projection is 1.5–3.0 times as large as a thickness of the band saw. In this mode, by making each projection wider or thicker than the saw, the friction between the saw and the sawn material is reduced, thereby enabling sawing bend to be more effectively prevented. Furthermore, giving each projection a width of 1.5 to 3.0 times the saw thickness improves the quality of the saw finish and reduces sawing time. If the width of the projection is less than 1.5 times the saw thickness, the friction between the saw body and the sawn material surface increases, causing warping and increasing the risk of sawing bend, while if the width of the projection is more than 3.0 times the saw thickness, the cutting resistance increases, thereby increasing the risk of sawing bend, or in the worst case, cracking.

(3) A band saw according to the above indicated mode (1) or (2), wherein a tip of each saw tooth protrudes by 0.02 mm in a direction of a thickness of the band saw from a surface of the saw body. In a band saw having a construction according to this embodiment, the saw teeth and saw tooth bases are made stronger, and sawing bend can be even more effectively prevented. If the amount of protrusion of the saw tooth tip is less than 0.02 mm, it is difficult to maintain a high level of strength and rigidity at the tooth base line area, thereby preventing the saw teeth and saw tooth bases from being effectively strengthened. While no upper limit for the amount of protrusion is specified herein, if the set amount of protrusion is excessive, the saw teeth will be angled substantially toward the inner side and the friction between the outer surface of the saw body and the sawn material will increase, thereby increasing the risk of warping and sawing bend. Therefore, the upper limit for the amount of protrusion of the saw tooth tips should be determined in consideration of the saw's thickness and width and the amount of tension exerted by the rolling machine on the saw body. Such amount should be set to ensure that sawing bend does not occur when the saw is used.

(4) A band saw processing apparatus for obtaining a band saw defined by any of the above-indicated modes (1)–(3), comprising: the apparatus comprising: a first and a second roller that grasp the band saw from opposite sides of a thickness thereof, the first roller exerting pressure on the band saw from one of the opposite sides, and the second roller exerting pressure on the band saw from an other of opposite sides, wherein edges of the first and second rollers are positioned to be offset from each other in an axial direction thereof, and the tooth base line area of the saw body of the band saw is grasped between the edges of the first and second rollers so that the saw teeth and the edge portion of the saw body of the band saw are angled toward the inner side of the saw body.

In the band saw processing apparatus having the construction according to this mode, the tooth base line area of the saw body can be bent under a substantially constant pressure along the entire circumference of the saw body with compressed by and rolled between the first roller and the second roller, making it possible to easily performing the operation without needing a sophisticated techniques of operators or the like. This results in dramatic increase in processing easiness.

The processing apparatus of this mode can be embodied by improving a rolling machine having a pair of known rollers. Specifically, it can be created by mounting as a pair of rollers first and second rollers having the construction conforming to the invention as described above, enabling easy realization of the processing apparatus having the construction conforming to this mode. Moreover, the band saw that may be processed by this embodiment is not limited to the band saw having a construction conforming to the any one of the above modes (1)–(3). This embodiment may be usefully applied to a conventional band saw as well.

(5) A band saw processing apparatus according to the above mode (4), wherein outer circumferential surfaces of the first and second rollers have opposite inclined configurations in the axial direction thereof, and wherein the saw tooth base line area of the base saw body is grasped by and rolled between large-diameter edges of the first roller and the second rollers so that the saw teeth and the edge portion of the band saw body are caused to be angled toward the inner side of the saw body.

(6) A band saw processing apparatus according to the above mode (4) or (5), further comprising a support roller that is supported coaxially with the second roller, and is positioned to face the first roller via the band saw for supporting the band saw.

(7) A method of manufacturing a band saw defined by any of the above-indicated modes (1)–(3), comprising the steps of: forming multiple saw teeth on a band saw plate having a long flat plate configuration; welding two longitudinal ends of the band saw plate together to form an annular band saw; bending the saw tooth base line area of the saw body toward the inner side of the saw body; and then setting the saw teeth.

According to the method of this invention, because teeth setting is performed after the saw teeth and saw tooth bases are strengthened by bending the saw tooth base line area of the saw body, strong tensioning is not necessary, thereby reducing the possibility of significant warping that occurs during tensioning and permitting leveling of the saw body to be carried out easily.

In this mode, the teeth setting operation comprises the known tensioning and back-filling processes that improve the physical characteristics of the band saw, as well as leveling (i.e., the warp elimination operation). Furthermore, when forming the projections, such operation is not limited in any particular fashion, and may be performed before the tooth base line area is bent or immediately before the teeth setting operation.

(8) A band saw teeth setting method for a band saw having a continuous saw body and multiple saw teeth provided entirely on one of laterally opposite edge portions of the saw body, the method comprising the steps of: bending the one of laterally opposite edge portions of the saw body and the saw tooth base line area toward the inner side of the saw body when setting teeth for said saw band.

According to this method of the present invention, because the strength and rigidity of the tooth base line area of the saw body are increased significantly, thereby improving the strength and rigidity of the saw body, the saw teeth and saw tooth bases. Therefore, the entire band saw can be strengthened more easily and effectively than is possible using the conventional band saw teeth setting method. The teeth setting method of this embodiment can be effectively applied not only to a band saw having the specific construction conforming the present invention as described above, but also to a band saw having a conventional construction.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

Figure 1:
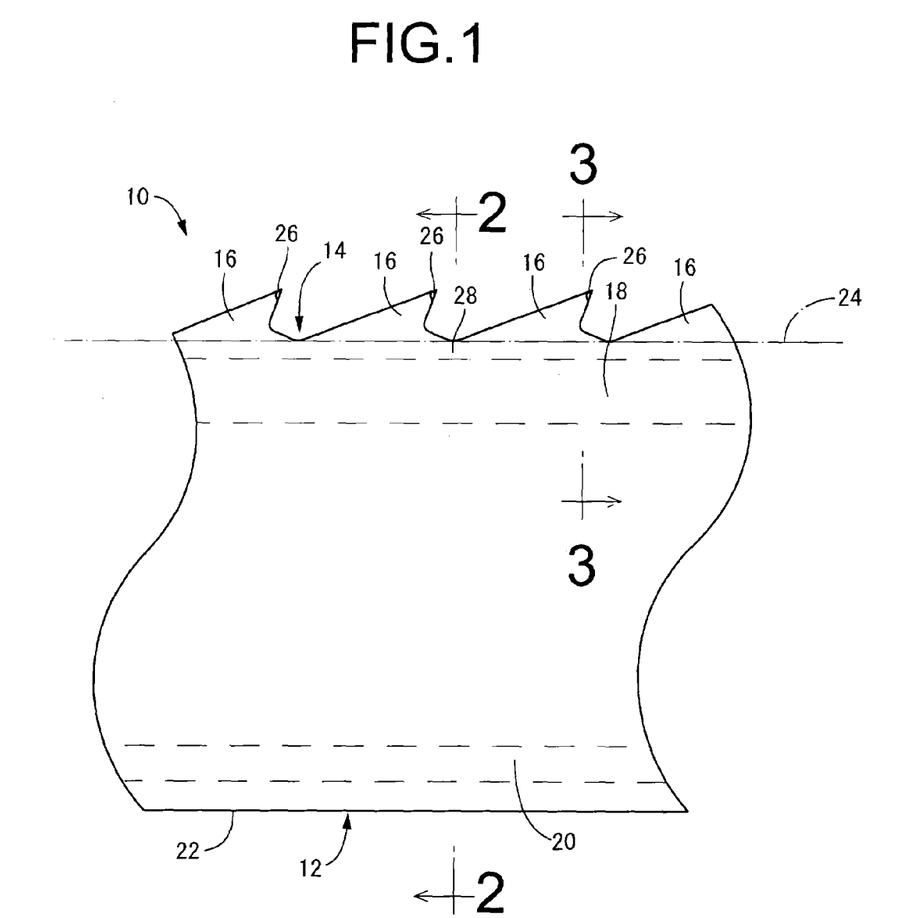
FIG. 1 is a fragmental side view of a band saw constructed according to one embodiment of the present invention.
Figure 2:
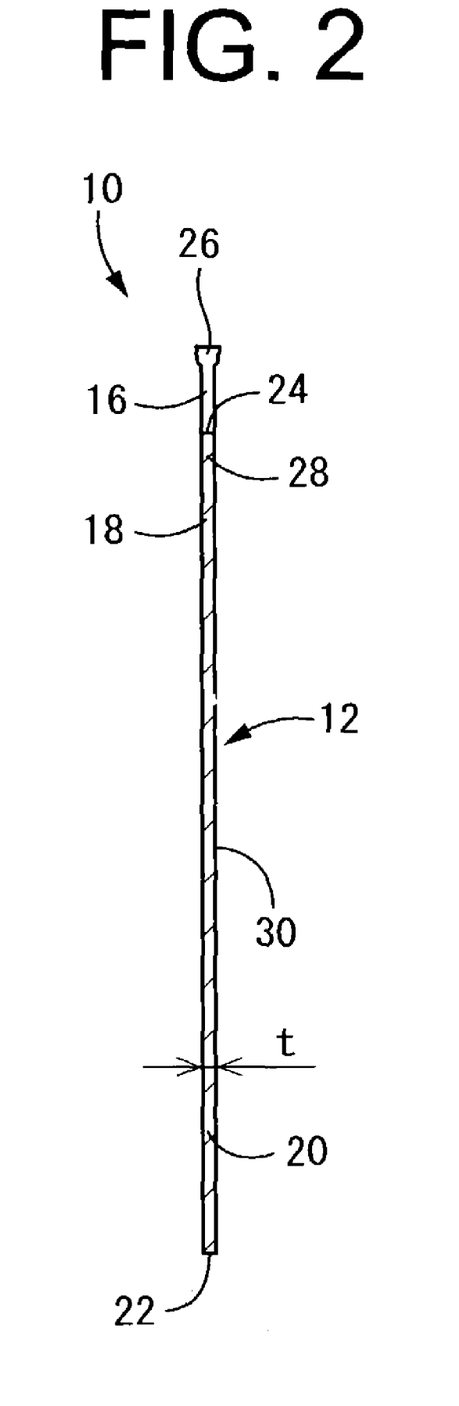
FIG. 2 is a cross-sectional view of the band saw of FIG. 1 taken along line II—II of FIG. 1.

Referring first to FIGS. 1 and 2, shown is a band saw (band saw blade) 10 constructed according to a first embodiment of the present invention. This band saw 10 comprises multiple saw teeth 16 formed on one of laterally opposite edge portions in the form of an edge portion 14 of an annular saw body 12. The band saw 10 is suspended around a pair of saw wheels mounted on a saw apparatus and is used for the cutting of lumber or the like while revolving in the circumferential direction based on the driving of the saw wheels.

More specifically, the saw body 12 of the band saw 10 is formed in an annular (continuous) configuration that continues over the entire circumferential direction, and is formed from tool steel alloy containing nickel or chrome. Furthermore, multiple saw teeth 16 are formed continuously along the circumferential direction on one edge portion 14 of the saw body 12 via punch forming or the like. There are no particular limitations on the configuration and size of these saw teeth 16.

This saw body 12 undergoes tensioning and back-filling. These tensioning and back-filling processes are well known, as disclosed in JP-A-61-56047, and are not described in detail here. Tensioning is an operation whereby strong tension is applied to both edge portions of the saw body 12 by stretching the center part of the saw body 12 using the rolling machine (so-called roll tensioning or stretch tensioning), or by obtaining the same configuration as a saw body having a stretched center part by causing the areas of both edge portions of the saw body 12 (deemed herein to include the tooth base side tension band 18 and the top line side tension band 20) or only the area of the edge portion on the saw tooth 16 side (deemed herein to include the tooth base side tension band 20) to constrict by means of heating using a gas burner or the like (so-called heat tensioning or shrink tensioning). Through such an operation, a reduction in tension due to expansion caused by heat from cutting or friction is reduced or avoided, thereby increasing the buckling strength and operation stability of the band saw 10. On the other hand, back-filling is an operation wherein the tension on the tooth base side tension band 18 is increased in response to the decline in the tension around the top line 22 by stretching the area of the top line 22 of the saw body 12 (deemed herein to include the top line side tension band 20). This reduces or avoids any decline in the tension on the tooth base side tension band 18 caused by the fact that thermal expansion of the tooth side tension band 18 due to the heat from cutting and friction is greater than the expansion on the top line side tension band 20, and thereby increases the buckling strength of the saw teeth 16.

In this embodiment, the tooth base side tension band 18 is considered the band-shaped part somewhat to the inside of the tooth base line 24 of the band saw 10 (deemed herein to include the edge portion 14 of the saw body 12) that continues in the circumferential direction, as shown in FIG. 1, and during tensioning, it is subjected to heat tensioning. The top line side tension band 20 of the saw body 12 is considered the band-shaped part somewhat to the inside of the top line 22 of the band saw 10 that continues in the circumferential direction, and during back-filling, it is subjected to rolling by the rolling machine, as well as to heat tensioning during tensioning if necessary.

A pick-shaped projection 26 is disposed on the tip of each saw tooth 16. This projection 26 is integrally formed with the saw tooth by pressing the saw tooth from both directions perpendicular to the thickness of the tooth tip using a swaging device, and shaping it using a shaper so as to form the shape of a "shamisen" pick. A sufficiently high degree of hardness is maintained in each projections. In this embodiment, the projection 26 has a width that is set to between 1.5 and 3.0 times the saw thickness (saw body thickness) t, and preferably to between 1.8 and 2.7 the thickness of the saw body t.

Figure 3:
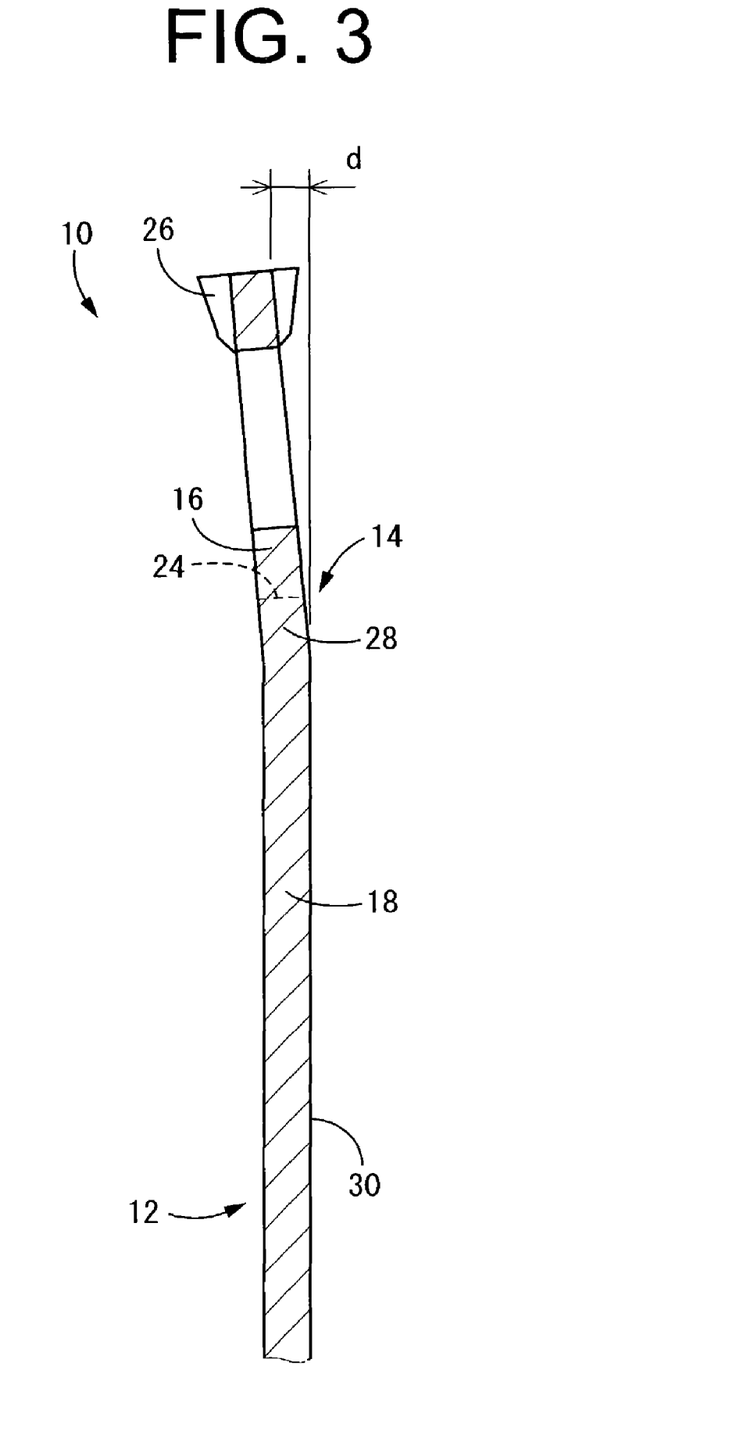
FIG. 3 is an enlargement of the III—III cross-section in FIG. 1, wherein key components are shown in an exaggerated manner for the sake of assistance in understanding of the characteristics of the present invention.

The tooth base line area 28 that is located between the edge portion 14 and the tooth base side tension band 18 of the saw body 12 and extends continuously in the circumferential direction is gently bent such that it forms a concavity facing the inner side of the saw body 12 (to the left in FIG. 2). That is, a bend is created near the tooth base line of the saw body 12. Consequently, the edge portion 14 (i.e., the tooth base area) of the saw body 12 and the multiple saw teeth 16 that are smoothly connected to the edge portion 14 are angled toward the inner side of the saw body 12. Furthermore, due to the angling of the saw teeth 16, the tip of each saw tooth 16 juts out a prescribed distance (d) in the direction of the saw thickness relative to the wide annular outer surface 30 of the saw body 12, as shown in enlargement in FIG. 3. This protrusion distance (d) of the tips of each saw tooth 16 is not limited in any particular fashion, but in this embodiment is set to (d)=0.02–0.2 mm. FIG. 3 shows an enlargement of the key components of the band saw 10 in order to assist in understanding its characteristics.

Figure 4:
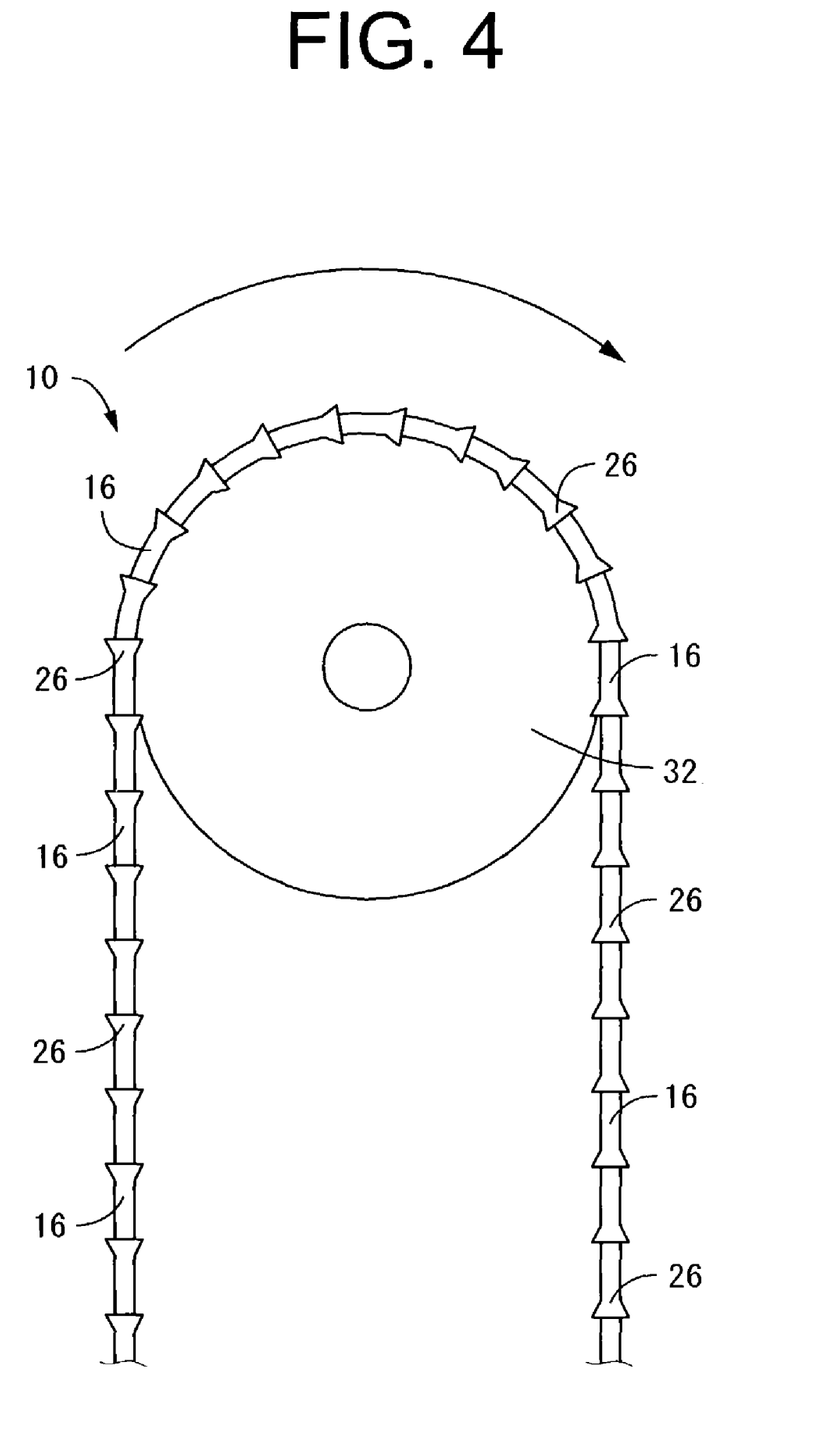
FIG. 4 is an explanatory view showing the state in which the band saw of FIG. 1 is mounted about the saw wheels of a band saw apparatus.

As shown in FIG. 4, the band saw 10 having the above construction is suspended over a pair of saw wheels 32 disposed in the band saw apparatus, and the revolution of the band saw 10 in the circumferential direction caused by the rotational driving of these saw wheels 32 enables the sawn material such as lumber to be milled. When the band saw 10 is mounted on the band saw apparatus, a prescribed tension is applied thereto in order to prevent detachment or sawing bend thereof, and while in this tension state, the band saw 10 is made essentially straight from the top line 22 to the tips of the saw teeth 16. While the construction of the band saw apparatus is well known in the art and will not be described in detail herein, in general, saw wheels (pulleys) 32 are supported to a frame (machine body) such that they face each other in the vertical direction via a head block (machine base) that supports the lumber, and lumber (sawn material) is milled by driving one or both of the upper and lower saw wheels 32 to rotate using a driving means such as a motor, thereby causing the band saw 10 suspended over them to revolve in the circumferential direction. In this embodiment, because back-filling is performed to the band saw 10, and therefore the tension on the top line side tension band 20 falls below the tension on the tooth base line side tension band 18, in order to prevent the band saw 10 from moving toward the tooth front side when the saw wheels 32 rotate, the center axis of the upper saw wheel 32 is angled beforehand toward the tooth front side.

Figure 5:
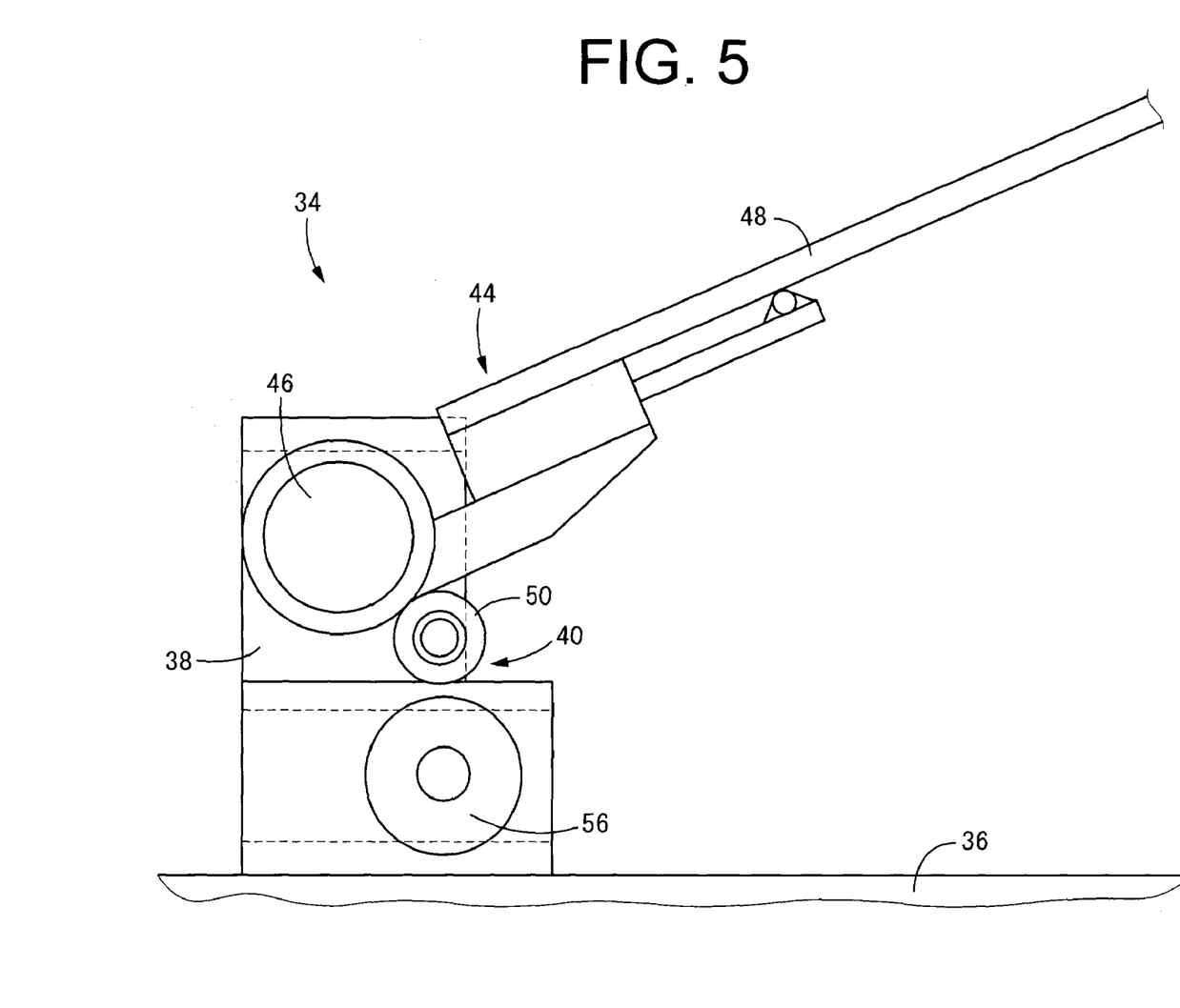
FIG. 5 is a front view showing a processing rolling machine used when creating a bend in the tooth base line area of the saw body of the band saw of FIG. 1.
Figure 6:
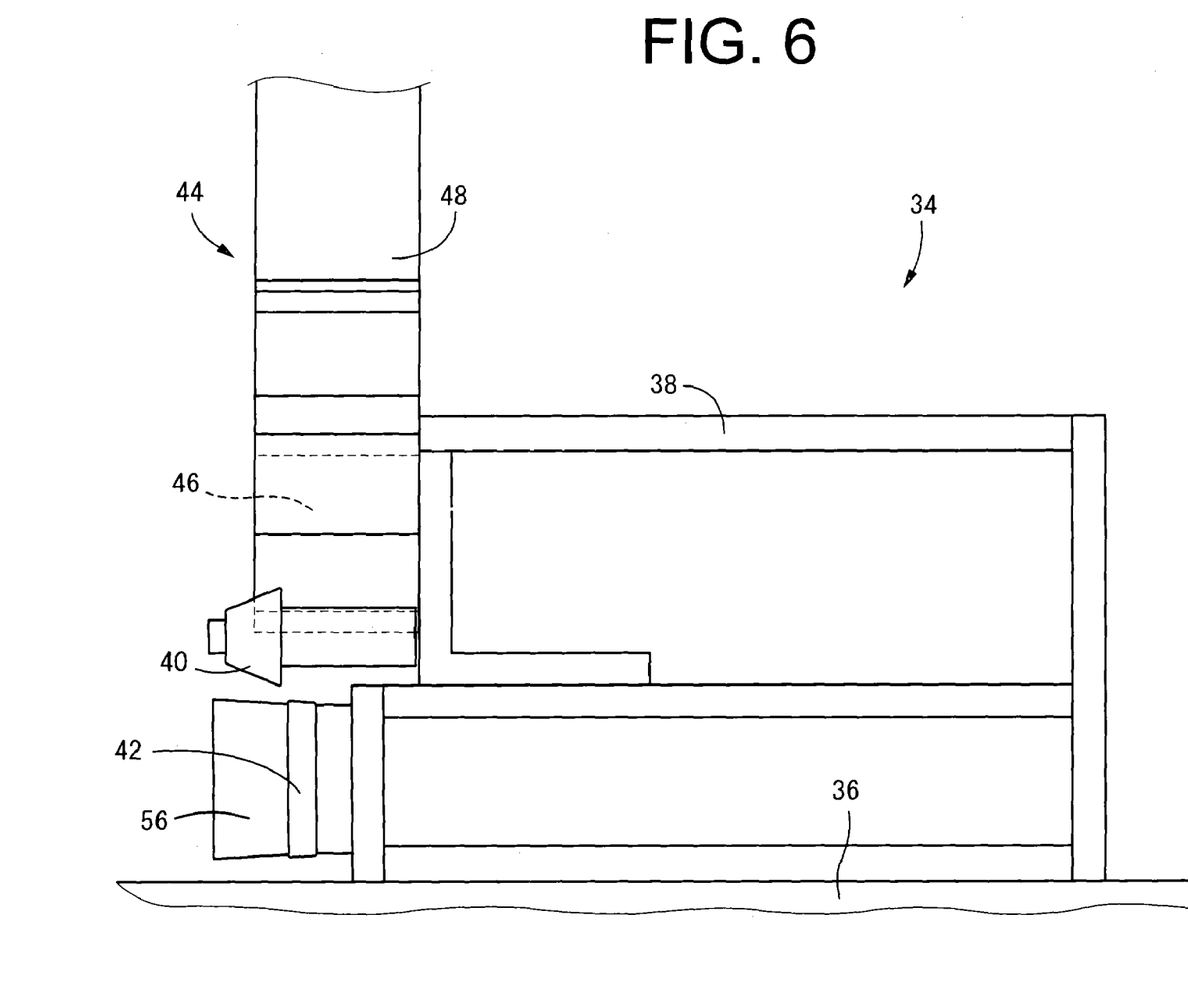
FIG. 6 is a side view of the processing rolling machine shown in FIG. 5.

Incidentally, when bending the tooth base line area 28 of the saw body 12, a processing rolling machine 34 is employed as the band saw processing apparatus, as shown in FIGS. 5 and 6. This processing rolling machine 34 has a construction wherein an upper roller 40 comprising a first roller and a lower roller 42 comprising a second roller are supported with a prescribed distance therebetween on a frame 38 fixed on the base 36.

Specifically, the frame 38 has essentially a rectangular frame construction, and a roller tightening handle 44 is mounted to a side wall thereof. The roller tightening handle 44 is constructed such that a grasping piece 48 is rotatably mounted to a pivot 46 fixed to a side wall of the frame 38. In addition, the upper roller 40 is welded or bolted to the outer circumferential surface of the pivot 46 of the grasping piece 48 such that the center axis of the upper roller 40 is essentially parallel to the pivot 46, thereby causing the upper roller 40 to rotate together with the grasping piece 48, with the pivot 46 functioning as a rotational axis.

Figure 7:
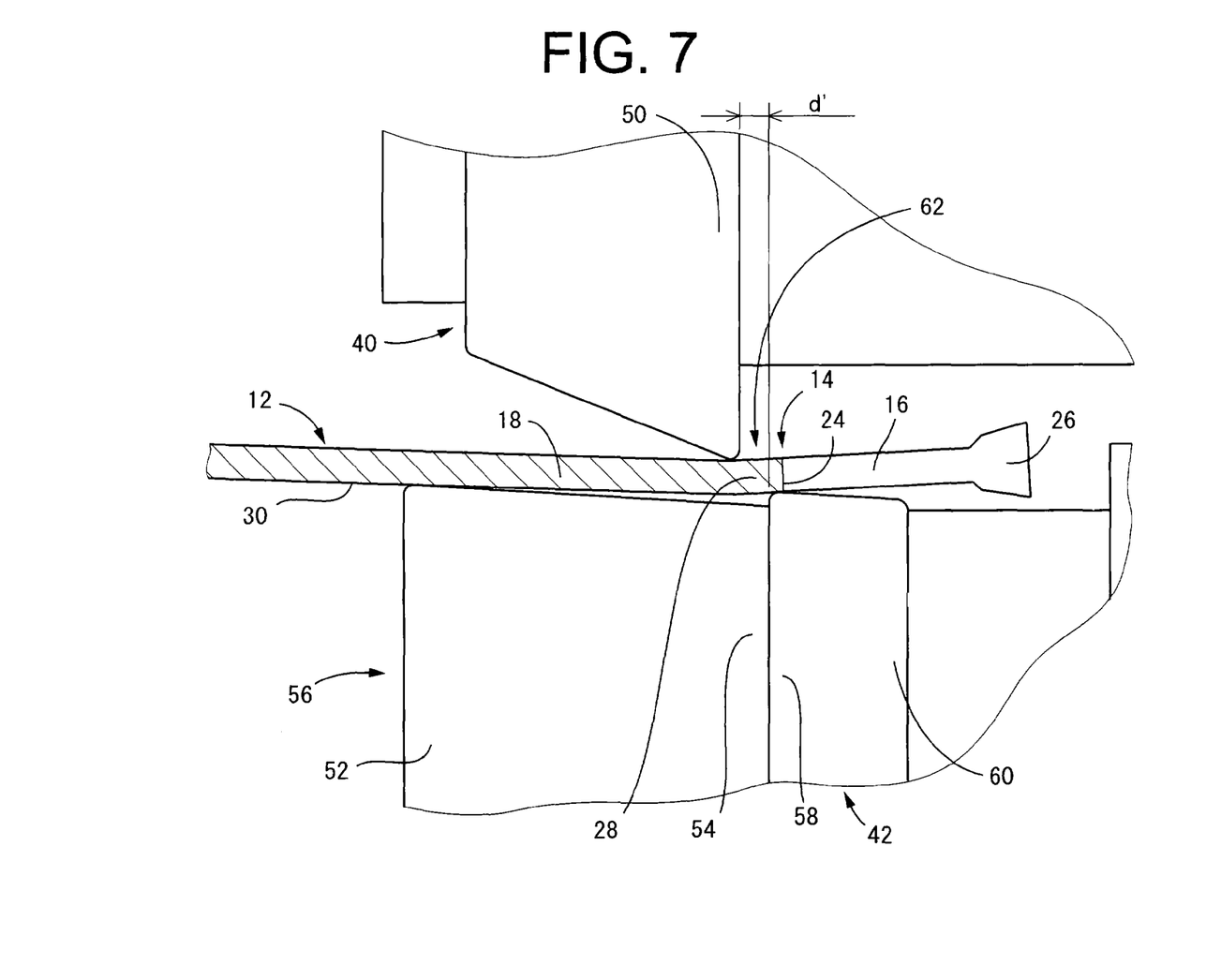
FIG. 7 is an explanatory view showing in enlargement the state after the tooth base line area of the saw body of the band saw shown in FIG. 1 is bent using the processing rolling machine of FIG. 5.

The upper roller 40 has essentially a conical configuration with a truncated apex, wherein the diameter gradually narrows from one end to the other end along the direction of its width, and is mounted to the roller tightening handle 44 such that the large-diameter end 50 of the roller 40 is positioned to the inside along the axial direction (on the right in FIG. 7).

In addition, a support roller 56 is positioned below the upper roller 40 with a prescribed gap therebetween. This support roller 56 has essentially a conical configuration with a truncated apex, wherein the large-diameter end 52 of the support roller 56 is positioned to the outside along the axial direction (at the left in FIG. 7), and is fixed to the lower roller 42 described below and therefore the side wall of the frame 38 such that the center axis thereof is roughly parallel to the center axis of the upper roller 40.

The lower roller 42 is mounted on the small-diameter end 54 of the support roller 56. The lower roller 42 is positioned coaxially with the support roller 56, and has essentially a conical configuration with a truncated apex, with the large-diameter end 58 having more or less the same diameter as the large-diameter end 52 of the support roller 56. This large-diameter end 58 is welded or bolted to the small-diameter end 54 of the support roller 56, and the small-diameter end 60 disposed on the inside in the axial direction (at the right in FIG. 7) is fixed to the side wall of the frame 38. As a result, the support roller 56 is supported coaxially with the lower roller 42, and across from the upper roller 40 in the vertical direction (above and below in FIG. 7).

In this embodiment in particular, the width of the support roller 56 is somewhat larger than the width of the upper roller 40, and the edge or the large-diameter end 50 of the upper roller 40 is positioned to the outside of the edge or the large-diameter end 58 of the lower roller 42 in the axial direction (at the left in FIG. 7). As a result, a gap 62 having a prescribed distance d' is formed between the upper roller 40 and the lower roller 42. As this makes clear, the upper roller 40 and the lower roller 42 have mutually opposing tapered configurations along the axial direction, and the large-diameter end of the lower roller 42 is offset from the large-diameter end 50 of the upper roller 40 along the axial direction.

In this embodiment, the tapering of the upper roller 40 is more severe than the tapering of the lower roller 42, which is approximately equal to the tapering of the tapering cf the support roller 56.

In the processing rolling machine 34 having the construction described above, as shown in enlargement in FIG. 7, the tooth base line area 28 of the saw body 12 is positioned between the large-diameter end 50 of the upper roller 40 and the large-diameter end 58 of the lower roller 42 (i.e., in the gap 62), and a prescribed pressure is applied to the grasping piece 48. At the same time, the saw blade 10 is placed on a leveling block not shown in the figure that is mounted on the base 36 or the like, and the saw body is positioned using guides. When the saw blade 10 is sent from one side of the processing rolling machine 34 to the other side (i.e., from right to left in FIG. 5) by an automatic saw blade conveyance machine equipped with drive means or by a known rolling machine used in tensioning or the like, a rolling action occurs at the tooth base line area 28 of the saw body 12 so as to create a bend in the tooth base line area 28 such that the bend is convex from the upper roller 40 side toward the lower roller 42 side. When the bend is created in the tooth base line area 28, the rolling action occurs to the tooth base line area 28 with the outer surface thereof not in contact with the small-diameter end 54 of the support roller 56 but with the outer surface of the saw body 12 further to the widthwise inside than the tooth base line area (the part at the left in FIG. 7) placed and supported on the large-diameter end 52 of the support roller 56.

In this embodiment, when the band saw 10 is set in the processing rolling machine 34, the band saw 10 is placed such that the inner surface of the tooth base line area 28 of the saw body 12 faces the upper roller 40 and the outer surface of the tooth base line area 28 faces the support roller 56. Consequently, when the tooth base line area 28 undergoes bend processing, the edge portion 14 of the saw body 12 and the saw teeth 16 become angled toward the inner side of the saw body 12.

An example of the manufacturing method for the band saw 10 having the above construction will now be described.

First, multiple teeth are formed along one widthwise edge portion of a band saw plate made of tool alloy steel or the like and having a long band configuration (a long flat plate configuration) via punch-forming, and a continuous annular saw blade is formed by joining the two ends of the band saw plate via gas welding or electric welding. In this manufacturing process, warping in the annular saw blade caused by heat processing, surface polishing, winding or the like is eliminated via a known leveling process using a hammer or a rolling machine. Furthermore, the punch-formed saw teeth are polished using a polishing machine (also termed a grinding apparatus or a setting machine) equipped with a grinder, the tooth hook angle, tooth back angle, tooth end angle, tooth height, tooth base configuration and the like are determined, and the desired saw teeth 16 are formed accordingly. In addition, a pick-shaped projection 26 having the shape of a "shamisen" pick is formed on the tip of each saw tooth 16 through a public-domain process using a swaging device and shaper wherein each saw tooth is pressed from both directions perpendicular to the thickness of the tooth tip and then shaped.

By forming a bend in the tooth base line area on the saw body of the annular saw blade that is to become the tooth base line area 28 of the saw body 12 of the band saw 10 via rolling using a processing rolling machine 34 having the above-described construction, the edge portion of the saw body and the saw teeth that are smoothly connected to the edge portion become angled toward the inner side of the saw body. The bend is created in the tooth base line area such that the tips of the teeth 16 of the band saw 10 protrude a prescribed distance (d) of 0.02–0.2 mm from the annular other surface 30 in the direction of the saw blade thickness. During this bending process, in consideration of the constriction of the saw body that accompanies heat tensioning of the tooth base line area (described below), the amount of protrusion of the tips of the saw teeth 16 may be set to a value higher than the target protrusion amount (d) of 0.02–0.2 mm. The amount of protrusion of the tips of the saw teeth 16 from the annular outer surface 30 may be measured by placing the annular outer surface 30 on a level block horizontally and inserting a gap gauge in the gap formed between the tips of the saw teeth 16 and the level block, for example.

Tensioning is performed via heat tensioning by heating the tooth base side tension band of the annular saw blade that is to become the tooth base side tension band 18 of the band saw 10 using a gas burner or the like, and back-filling is performed by rolling the top line side tension band of the annular saw blade that is to become the top line side tension band 20 of the band saw 10 using a public-domain rolling machine, thereby increasing the tension of the tooth base side tension band. Warping that occurs due to the tensioning and back-filling processes described above is eliminated by carrying out leveling once more using the above-described rolling machine or a hammer, or by carrying out leveling via rolling together with back-filling when the back-filling process is carried out. In this leveling process, both surfaces of the saw body excluding the tooth base line area are made horizontal. As is clear from the above discussion, in this embodiment, the teeth setting process includes the tensioning, back-filling and leveling processes described above.

The desired band saw 10 is obtained by subjecting the tips that include the pick-shaped projections 26, as well as the side surfaces of the saw teeth 16, to polishing using a polishing machine equipped with a grinder, and if necessary, ensuring that the saw teeth 16 and the like have sufficient hardness and flexibility by welding Stellite thereto.

Incidentally, although the degree of wear and weakening depends on the nature of the sawn material and the length of use, because the saw tooth tips become worn down and the saw teeth and its surrounding areas lose strength as the amount of cutting resistance and friction heat increase when the band saw 10 is suspended over the saw wheels 32 and is used to saw sawn material for a long period of time, teeth setting must be performed. In this embodiment, this teeth setting may be performed via the following procedure, for example.

First, the configuration of the band saw body 12 is checked by laying the saw body 12 flat on a leveling block and performing a level check using a straight gauge, or by placing the top line of the saw body 12 on a back gauge and performing a back check. The warping or the like that is discovered from the results of these checks is then eliminated using a hammer or a rolling machine (including a de-warping machine).

Based on the degree of wear or damage to the saw teeth 16, new saw teeth 16' are formed by punching out new saw teeth on the inner widthwise side of the saw body 12 and polishing them, or by polishing the existing saw teeth using a grinder only. Furthermore, pick-shaped projections 26 are formed using a swaging device and shaper on the tips of the saw teeth 16'.

In this embodiment, regardless of whether or not new saw teeth 16' are formed, the tooth base line area 28 of the saw body 12 undergoes an angling process whereby the edge portion 14 of the saw body 12 and the saw teeth 16 (16') are angled toward the inner side of the saw body 12 by bending them using a processing rolling machine 34 having the construction described above, for example. This is done because the amount of protrusion (d) of the remaining usable saw teeth 16 from the annular outer surface 30 no longer matches the target value, and in the worst case, there is a possibility that the saw teeth 16 may be angled toward the outer side of the saw body 12.

As described above, where the configuration check of the saw body 10 is performed once more and the degree of tensioning and the back-filling amount no longer match the target valves, tensioning and back-filling are carried out in this embodiment by carrying out polishing and Stellite welding on the saw teeth 16 if necessary, whereupon teeth setting is completed.

In the band saw 10 having the above construction, because the rigidity of the tooth base line area 28 of the saw body 12 increases due to the bend in the tooth base line area 28, thereby increasing the rigidity of the tooth bases and the teeth 16, the saw blade 10 can be used effectively for a long period of time and production efficiency can be effectively increased.

In addition, the pick-shaped projections on the tips of the saw teeth 16 that have a width of 1.5–3.0 times the thickness of the saw teeth permit sawing bend to be further prevented in this embodiment.

Furthermore, in this embodiment, because the bending of the tooth base line area 28 of the saw body 12 is achieved through the application of essentially constant pressure over the entire circumferential length of the saw body 12 using a processing rolling machine 34 having the above-described construction, and because various bend processing operations may be implemented by appropriately changing the configuration and size of the upper roller 40 and the lower roller 42, workability and ease of manufacture can be further improved.

According to the band saw 10 manufacturing method of this embodiment, because the saw teeth 16 and the saw tooth bases are effectively strengthened simply by carrying out teeth setting after the tooth base line area 28 of the saw body 12 is bent, the tension on the tooth base line area 28 is maintained at a high level regardless of whether a high degree of tensioning is carried out during teeth setting, and consequently workability and ease of manufacture are easily improved.

Furthermore, according to the band saw 10 manufacturing method of this embodiment, because the saw tooth bases and the saw teeth 16 are effectively strengthened simply by bending the base line area 28 of the saw body 12, superior strengthening performance and ease of processing are attained that cannot be achieved using the band saw teeth setting method of the prior art.

Embodiments of the present invention were described in detail above, but such embodiments represent mere examples of the present invention, which should not be understood as limited by the specific descriptions pertaining to such embodiments, and incorporate various changes, revisions and improvements based on the knowledge held by a person skilled in the art. Furthermore, needless to say, these embodiments include all variations falling within the scope of the present invention to the extent they do not depart from the essential scope thereof.

For example, in the above embodiment, pick-shaped projections 26 were formed on the tips of the saw teeth 16, as shown in the figures, but such projections are naturally not limited to this configuration, and offset projections or projections having other configurations may also be disposed on the tooth tips.

Moreover, the processing rolling machine 34 described in connection with the above embodiments may also include an adjustment mechanism that adjusts the roller pressure, and more specifically, such adjustment mechanism may constitute a pin or the like that restricts the rotation of the roller tightening handle 44 (or the grasping piece 48).

In this embodiment, the processing rolling machine 34 was fixed to a level block, but it is not limited to this implementation. For example, a portable rolling machine 34 that includes a mounting piece on the bottom thereof such that the machine can be secured to a vise installed in a prescribed place may be used.

Furthermore, the processing rolling machine is not limited to the construction described above. A construction may be adopted wherein, for example, the upper and lower rollers are disposed facing each other such that they grasp the band saw 10 from both sides of the saw's thickness and an annular groove that extends circumferentially is formed over the entire outer surface of the upper roller, while an annular protrusion that extends circumferentially is formed over the entire outer surface of the lower roller, such that the tooth base line area 28 of the saw body 12 is grasped and bent in the gap between the annular groove and annular protrusion, or a construction may be adopted that uses the automatic processing rolling machine described in JP-A-11-300523 or JP-A-8-290326, except that in place of the pair of rollers incorporated in the processing rolling machine, the upper roller 40 and lower roller 42 having the specific constructions described above are used.

In addition, the specific processing apparatus having the first and second rollers according to the present invention may be incorporated in the various other types of band saw processing apparatus, such as a known automatic de-warping machine of the prior art.

EXAMPLES

Examples regarding the useful life of the band saw having the construction according to the present invention will be described in detail below with reference to Tables 1–5.

Example 1

A band saw having a saw width of 125 mm, a saw blade thickness of 0.9 mm, a saw body length of 7250 mm, and a saw tooth pitch of 28 mm was produced. The tooth base side tension band of the saw body of this band saw was subjected to heat tensioning to achieve a tensioning degree of 28, and the top line area of the saw body was subjected to back-filling using a 75 cm-long back gauge where the back-filling amount (I) was 0.5 mm. In the Example 1, a pick-shaped projection was formed on the tip of each saw tooth with an initial width (w) of 1.8 mm, and the initial value for the amount of protrusion (d) of the tip of each saw tooth along the direction of the saw's thickness relative to the surface of the saw body was set to 0.06 mm. The band saw was then mounted to a band saw apparatus having a model number 1100 (43 elbow type) and a saw wheel rotation speed of 766 rpm and driven to revolve. Saw material comprising a white cedar log with bark having an end diameter of 15–23 cm and 30–50 years of growth rings was milled by the band saw while it was conveyed through the band saw using a carriage having a model number (indicating the opening of the head block) 760 in order to process the log into a 3,000 mm (L)×76 mm (W)×16 mm (T) board to be used in a drain board. Using this Example 1, first through fourth processing sessions were held. After each session, the saw teeth and projections were polished, teeth setting wherein the projection width (w) and the saw tooth tip protrusion amount (d) were reset was carried out, and the time at which sawing bend occurred (i.e., the length of time that the saw could be used for processing) was measured. The results are shown in Table 1. In this Example 1, as well as in the Examples 2 through 4 and the Comparison Example 1 described below, the band saw apparatus, carriage, saw body tension exerted against the band saw wheels, sawn material and end product were identical. The setting operation described above included tensioning and back-filling, but because the initial degree of tensioning (28) and the initial back-filling amount (0.5 mm) were maintained in this Example 1 and the Examples 2 through 4, as well as in the Comparison Example 1, that band saw was subjected to only minimal tensioning and back-filling.

TABLE 1

| | DATE | SAW WIDTH | PROJECTION WIDTH | AMOUNT OF PROTRUSION | USABLE TIME |
|---|---|---|---|---|---|
| 1st Trial | 2002.4.10 | 125 mm | 1.8 mm | 0.06 mm | 300 min. (5 hour) |
| 2nd Trial | 2002.4.17 | 124.7 mm | 1.75 mm | 0.06 mm | 300 min. (5 hour) |
| 3rd Trial | 2002.4.20 | 124.3 mm | 1.7 mm | 0.05 mm | 240 min. (4 hour) |
| 4th Trial | 2002.5.01 | 123.2 mm | 1.8 mm | 0.04 mm | 270 min. (4.5 hour) |

Comparison Example 1

A band saw identical to that used in the Example 1 was produced. Although a pick-shaped projection having an initial width (w) of 1.8 mm was formed on the tip of each saw tooth, the amount of protrusion of the tip of each saw tooth along the direction of the thickness of the saw body relative to the surface of the saw body was set to 0. In other words, the band saw was made essentially straight from the top line to the tips of the saw teeth without bending the saw tooth base line area of the saw body. The first through third processing sessions were carried out in the same manner as in connection with the Example 1. After each session, the saw teeth and projections were polished, the projection width (w) and the saw tooth tip protrusion amount (d) were reset, and the time at which sawing bend occurred (i.e., the length of time that the saw could be used for processing) was measured. The results are shown in Table 2. Furthermore, during the third processing session carried out in regard to the Example 1 in particular, the tooth base line area of the saw body was bent toward the outer side of the saw body, thereby angling the edge portion of the saw body and the saw teeth toward the outer side of the saw body, and the protrusion amount (d) of each tooth tip relative to the surface of the saw body was set to −0.04 mm.

TABLE 2

|  | DATE | SAW WIDTH | PROJECTION WIDTH | AMOUNT OF PROTRUSION | USABLE TIME |
| --- | --- | --- | --- | --- | --- |
| 1st Trial | 2002.4.10 | 125 mm | 1.8 mm | 0 mm | 180 min. (3 hour) |
| 2nd Trial | 2002.4.20 | 124.7 mm | 1.75 mm | 0 mm | 180 min. (3 hour) |
| 3rd Trial | 2002.4.27 | 123.5 mm | 1.8 mm | −0.04 mm | 120 min. (2 hour) |

As is apparent from the Tables 1 and 2, it is clear that a band saw having a bent tooth base line area offers a longer useful life compared to a band saw having a straight, non-curved tooth baseline area.

From the results of the third processing session shown in Table 2, it is clear that a band saw in which the edge portion of the saw body including the tooth bases and the saw teeth are angled toward the inner side of the saw body offers a dramatically improved useful life compared to a band saw in which the edge portion of the saw body including the tooth bases and the saw teeth are angled toward the outer side of the saw body.

Examples 2 through 4

Three band saws having the same initial dimensions as the Example 1 were produced, and one was used for six months and deemed Example 2, one was used for nine months and deemed Example 3, and one was used for 11 months and deemed Example 4. In each of these Examples 2 through 4, as with the Example 1, the tooth base side tension band of the saw body was subjected to heat tensioning to achieve a tensioning degree of 28, and the top line area of the saw body was subjected to back-filling using a 75 cm-long back gauge where the back-filling amount (I) was 0.5 mm. The first through third processing sessions were carried out with regard to the Examples 2 through 4 in the same manner as in connection with the Example 1. After each session, the saw teeth and projections were polished, the projection width (w) and the saw tooth tip protrusion amount (d) were reset, and the time at which sawing bend occurred (i.e., the length of time that the saw could be used for processing) was measured. The results for the Example 2 are shown in Table 3, the results for the Example 3 are shown in Table 4, and the results for the Example 4 are shown in Table 5.

TABLE 3

|  | DATE | SAW WIDTH | PROJECTION WIDTH | AMOUNT OF PROTRUSION | USABLE TIME |
| --- | --- | --- | --- | --- | --- |
| 1st Trial | 2002.4.06 | 112.7 mm | 1.8 mm | 0.15 mm | 240 min. (4 hour) |
| 2nd Trial | 2002.4.13 | 112.3 mm | 1.7 mm | 0.10 mm | 210 min. (3.5 hour) |
| 3rd Trial | 2002.4.27 | 111.2 mm | 1.9 mm | 0.08 mm | 240 min. (4 hour) |

TABLE 4

|  | DATE | SAW WIDTH | PROJECTION WIDTH | AMOUNT OF PROTRUSION | USABLE TIME |
| --- | --- | --- | --- | --- | --- |
| 1st Trial | 2002.4.03 | 107.7 mm | 1.75 mm | 0.15 mm | 240 min. (4 hour) |
| 2nd Trial | 2002.4.13 | 107.4 mm | 1.65 mm | 0.15 mm | 180 min. (3 hour) |
| 3rd Trial | 2002.5.01 | 106.5 mm | 1.9 mm | 0.10 mm | 270 min. (4.5 hour) |

TABLE 5

|  | DATE | SAW WIDTH | PROJECTION WIDTH | AMOUNT OF PROTRUSION | USABLE TIME |
| --- | --- | --- | --- | --- | --- |
| 1st Trial | 2002.4.03 | 106 mm | 1.70 mm | 0.2 mm | 240 min. (4 hour) |
| 2nd Trial | 2002.4.10 | 105.5 mm | 1.65 mm | 0.15 mm | 180 min. (3 hour) |
| 3rd Trial | 2002.4.24 | 105 mm | 1.6 mm | 0.15 mm | 150 min. (2.5 hour) |

It is apparent from these Tables 3 through 5 that in a band saw having a construction conforming to the present invention, the useful life is effectively improved by bending the tooth base line area of the saw body toward the inner side of the saw body, regardless of either the period of time over which the band saw has been used or the dimensions of the saw body such as the width.

In addition, it is seen from the Tables 3 and 4 that the useful life of the band saw is effectively improved by setting the width of the projections to be wider than the thickness of the band saw.

As is clear from the above descriptions, in a band saw having a construction conforming to the present invention, because the rigidity of the tooth base line area of the saw body against the cutting load increases when the tooth base line area is bent, thereby increasing the rigidity of the tooth bases and the saw teeth, superior durability can be obtained using simple processing.

Furthermore, using the band saw processing apparatus having a construction conforming to the present invention, a bend in the tooth base line area of the saw body can be easily created over the entire circumferential length of the saw body.

Moreover, according to the band saw manufacturing method of the present invention, because the tension on the tooth base line area can be maintained at a high level without the need for strong tensioning during teeth setting by performing teeth setting after a bend is created in the tooth base line area of the saw body, thereby strengthening the saw teeth and saw tooth bases, workability and ease of manufacture can be effectively improved.

In addition, according to the band saw teeth setting method of the present invention, because the tooth bases and saw teeth can be effectively strengthened simply by creating a bend in the tooth base line area of the saw body, superior workability that cannot be achieved using the band saw teeth setting methods of the prior art can be obtained.

It is also to be understood that the present invention may be embodied with various other changes, modifications and improvements, which may occur to those skilled in the art, without departing from the spirit and scope of the invention defined in the following claims.

What is claimed is:

1. A band saw for making straight cuts, comprising:
   a continuous saw body having an inner side and an outer side, a first pre-mounting straight section that is straight along a width direction, and a second pre-mounting straight section that is straight along the width direction and extending continuous from the first pre-mounting straight section, said saw body being adapted to be suspended between a pair of spaced pulleys, with said inner side facing the pulleys; and
   multiple saw teeth provided entirely on one edge portion of said saw body and extending from the first pre-mounting straight section,
   wherein said saw body is subject to tensioning at a tooth base side tension zone located in the second pre-mounting straight section,
   wherein the first pre-mounting straight section is angled relative to the second pre-mounting straight section at a location immediately next to a tooth base line within a tooth base line area so that the entire saw teeth are angled toward said inner side when the saw body is not subject to tensioning,
   wherein the tooth base line is located at an innermost part of gullets of the teeth,
   wherein the tooth base line area is located between the tooth base line and the tooth base tension zone, and
   wherein the band saw substantially straightens from the one edge portion to an opposite edge portion thereof when the band saw is operationally suspended and tensioned between said spaced pulleys so that the angle formed between the first and second pre-mounting sections substantially disappears.

2. A band saw according to claim 1, wherein a projection is formed on a tip of each saw tooth, and a width of each projection is 1.5–3.0 times as large as a thickness of said band saw.

3. A band saw according to claim 1, wherein a tip of each saw tooth protrudes by 0.02 mm in a direction of a thickness of said band saw from a surface of said saw body.

* * * * *

UNITED STATES PATENT AND TRADEMARK OFFICE
CERTIFICATE OF CORRECTION

| | |
|---|---|
| PATENT NO. | : 7,121,180 B2 |
| APPLICATION NO. | : 10/601685 |
| DATED | : October 17, 2006 |
| INVENTOR(S) | : Tatsuo Shimofurutani |

It is certified that error appears in the above-identified patent and that said Letters Patent is hereby corrected as shown below:

Col. 16, lines, 27-28: the following claim was omitted and should be included:

-- 4. A band saw processing apparatus according to claim 1, wherein said first pre-mounting straight section is angled to strengthen and enhance durability of the saw teeth.--

Signed and Sealed this

Nineteenth Day of December, 2006

JON W. DUDAS
*Director of the United States Patent and Trademark Office*